US009007264B2

(12) United States Patent
Riley et al.

(10) Patent No.: US 9,007,264 B2
(45) Date of Patent: Apr. 14, 2015

(54) METHODS AND SYSTEMS FOR TRACKING OBJECTS OR PEOPLE WITHIN A DESIRED AREA

(75) Inventors: Jim Riley, Rochester, NY (US); Steve Markham, Rochester, NY (US); Michael Marriam, Rochester, NY (US)

(73) Assignee: Robert Bosch GmbH, Stuttgart (DE)

( * ) Notice: Subject to any disclaimer, the term of this patent is extended or adjusted under 35 U.S.C. 154(b) by 1295 days.

(21) Appl. No.: 12/040,323

(22) Filed: Feb. 29, 2008

(65) Prior Publication Data
US 2009/0221301 A1 Sep. 3, 2009

(51) Int. Cl.
G01S 3/02 (2006.01)
G08B 13/14 (2006.01)
G08B 21/02 (2006.01)
G01S 5/02 (2010.01)
G01S 5/14 (2006.01)
G01S 11/02 (2010.01)

(52) U.S. Cl.
CPC .............. *G08B 13/1427* (2013.01); *G01S 5/14* (2013.01); *G01S 11/02* (2013.01); *G08B 21/023* (2013.01); *G08B 21/0236* (2013.01); *G08B 21/0247* (2013.01); *G08B 21/0261* (2013.01); *G01S 5/0231* (2013.01)

(58) Field of Classification Search
CPC ............ G08B 13/1427; G08B 21/023; G08B 21/0236; G08B 21/247; G08B 21/261; G01S 5/0231; G01S 5/14; G01S 11/02
USPC ......................................................... 342/458
See application file for complete search history.

(56) References Cited

U.S. PATENT DOCUMENTS

| 4,675,656 | A | | 6/1987 | Narcisse | |
|---|---|---|---|---|---|
| 4,703,444 | A | * | 10/1987 | Storms et al. | 342/463 |
| 5,086,290 | A | | 2/1992 | Murray et al. | |
| 5,119,104 | A | * | 6/1992 | Heller | 342/450 |
| 5,357,254 | A | | 10/1994 | Kah, Jr. | |
| 5,510,795 | A | * | 4/1996 | Koelle | 342/114 |
| 5,661,460 | A | | 8/1997 | Sallen et al. | |
| 5,745,037 | A | * | 4/1998 | Guthrie et al. | 340/573.4 |
| 5,920,287 | A | * | 7/1999 | Belcher et al. | 342/450 |
| 5,977,913 | A | * | 11/1999 | Christ | 342/465 |
| 5,995,007 | A | | 11/1999 | Borja et al. | |
| 6,198,390 | B1 | | 3/2001 | Schlager et al. | |
| 6,380,894 | B1 | * | 4/2002 | Boyd et al. | 342/450 |
| 6,462,656 | B2 | | 10/2002 | Ulrich et al. | |
| 6,859,171 | B2 | | 2/2005 | Durst et al. | |
| 6,873,245 | B2 | | 3/2005 | del Castillo et al. | |
| 6,940,403 | B2 | * | 9/2005 | Kail, IV | 340/539.12 |
| 7,123,141 | B2 | | 10/2006 | Contestabile | |
| 7,164,354 | B1 | | 1/2007 | Panzer | |
| 7,259,671 | B2 | | 8/2007 | Ganley et al. | |
| 2005/0130677 | A1 | * | 6/2005 | Meunier et al. | 455/456.6 |

* cited by examiner

*Primary Examiner* — Frank J McGue
(74) *Attorney, Agent, or Firm* — Michael Best & Friedrich LLP

(57) ABSTRACT

A method for tracking the object includes providing a motion detector on a first radio frequency device and detecting the motion of the first radio frequency device, transmitting radio frequency location signals from the first radio frequency device to a second radio frequency device with time intervals between the transmissions, decreasing the time intervals between the transmissions from the first radio frequency device to the second radio frequency device in response to the detection of motion by the motion detector, and periodically determining a separation distance between the first radio frequency device and the second radio frequency device based on the radio frequency location signals transmitted from the first radio frequency device to the second radio frequency device.

9 Claims, 9 Drawing Sheets

FIG. 9

52 — The boundary of area in which the object or person is to be confined is defined and a radio frequency receiver adapted to receive transmissions from the radio transmitter is centrally positioned within the bounded area.

↓

54 — The security system is calibrated by establishing signals relating to the bounded area.

- 54a — The radio transmitter is positioned at a location proximal the radio frequency receiver and the transmission of a first calibration signal from transmitter to receiver is initiated.
- 54b — The receiver receives the first calibration signal and the security system processor records the strength of the first calibration signal.
- 54c — The radio transmitter is positioned at a location on the boundary and the transmission of a second calibration signal from transmitter to receiver is initiated.
- 54d — The receiver receives the second calibration signal and the security system processor records the strength of the second calibration signal.

↓

56 — The radio transmitter is coupled with a motion detector, and is coupled to the object or person to be monitored/tracked. The object or person is then placed within the bounded area.

↓

58 — The motion detector monitors the object or person for movement and detects any motion by the object or person.

Motion detected?

- No (60) → The radio transmitter transmits location signals to the radio receiver at a first periodic rate.
  - 62 → The processor periodically compares the strength of the location signals to the strength of the second calibration signal. This periodic comparison is performed at a first frequency rate. Is location signal strength less than strength of second calibration signal?
    - No → (loop back)
    - Yes → 68 Initiate alarm

- Yes (64) → The radio transmitter transmits location signals to the radio receiver at a second periodic rate.
  - 66 → The receiver receives a wake up signal and the processor periodically compares the strength of the location signals to the strength of the second calibration signal. This periodic comparison is performed at a second frequency rate. Is location signal strength less than strength of second calibration signal?
    - Yes → 68 Initiate alarm
    - No → (loop back)

METHODS AND SYSTEMS FOR TRACKING OBJECTS OR PEOPLE WITHIN A DESIRED AREA

BACKGROUND

1. Field of the Invention

The present invention relates to apparatuses and methods for monitoring a distance between an item of interest and a base location.

2. Description of the Related Art

Systems have been developed for tracking or monitoring the location of an object or person within a given area. Such systems are useful to provide warnings when valuable objects or equipment are being removed from a designated area. Such systems are also useful to provide warnings when people leave a designated area, such as a baby in a hospital nursery, an inmate in a minimum security prison, or an elderly resident of a nursing facility. These systems typically employ a transmitter that is coupled to the object or person and that transmits a location signal. Multiple receivers are used to receive the location signal and to determine or coordinate a transmitter's position by measuring and comparing the difference in the time that the location signal reaches each receiver. Other systems employ the use of global positioning satellites to track the location of objects. Unfortunately, these systems can require expensive, highly technical equipment that can be difficult to install and challenging to use.

What is neither disclosed by nor obvious in view of the prior art is a system that can monitor the location of an object or person using relatively simple, inexpensive and efficient equipment.

SUMMARY

The present invention provides methods and systems for tracking objects or people in a desired area. In one aspect, the method for tracking the object includes the steps of providing a motion detector on a first radio frequency device and detecting the motion of the first radio frequency device, transmitting radio frequency location signals from the first radio frequency device to a second radio frequency device with time intervals between the transmissions, decreasing the time intervals between the transmissions from the first radio frequency device to the second radio frequency device in response to the detection of motion by the motion detector, and periodically determining a separation distance between the first radio frequency device and the second radio frequency device based on the radio frequency location signals transmitted from the first radio frequency device to the second radio frequency device.

In another aspect, the step of determining a separation distance between the first radio frequency device and the second radio device may include the steps of obtaining a first boundary calibration setting by positioning the first radio frequency device at a first distance from the second radio frequency device and transmitting a first boundary calibration signal from the first radio frequency device to the second radio frequency device, recording the strength of the first boundary calibration signal, obtaining a second boundary calibration setting by positioning the first radio frequency device at a second distance from the second radio frequency device and transmitting a second boundary calibration signal from the first radio frequency device to the second radio frequency device, the second distance being greater than the first distance, recording the strength of the second boundary calibration signal, and comparing the strengths of the radio frequency location signals to the strengths of the first and second boundary location signals to determine the separation distance.

In another aspect, the invention provides a security system for tracking the location of at least one object within an area defined by a boundary. The security system includes at least one first radio frequency device. The at least one first radio frequency device is coupled to a corresponding one said object. The at least one first radio frequency device is adapted to periodically transmit radio frequency location signals. The security system also includes a second radio frequency device discrete from the first radio frequency device. The second radio frequency device receives the radio frequency location signals from the first radio frequency device. The security system also includes at least one motion detector coupled with the at least one first radio frequency device. The at least one motion detector detects when the at least one first radio frequency device is in motion. In operation, the at least one first radio frequency device periodically transmits the radio frequency location signals at a first rate while the at least one first radio frequency device is not in motion. The at least one first radio frequency device periodically transmits the radio frequency location signals at a second rate in response to the motion detector detecting movement of said at least one first radio frequency device. The second rate is greater than the first rate.

In another aspect of the invention, the security system includes a first radio frequency device coupled to an object to be tracked. The first radio frequency device periodically transmits radio frequency location signals. A second radio frequency device discrete from the first radio frequency device receives the radio frequency location signals. The second radio frequency device periodically calculates a separation distance between the first radio frequency device and the second radio device based on the strengths of the radio frequency location signals. A motion detector is coupled with the first radio frequency device. The motion detector detects when the first radio frequency device is in motion. The motion detector initiates a wake up signal in response to the motion detector detecting motion of the first radio frequency device. In operation, the second radio frequency device receives the wake up signal and periodically calculates the separation distance at a greater periodic rate relative to a rate before the second radio frequency device receives the wake up signal.

In other aspects of the invention, the first radio frequency device may include a boundary calibration switch. The boundary calibration switch initiates the transmission of at least one boundary calibration signal from the one first radio frequency device. The security system may further include a processor communicatively coupled to the second radio frequency device. The processor may process the at least one boundary calibration signal and store data relating to the at least one boundary calibration signal. The processor may compare the data relating to the at least one boundary calibration signal to location data relating to the radio frequency location signals.

The systems and methods of the present invention provide for the monitoring of objects and/or people within a desired area and may provide alerts when objects are removed from, or people leave, the area. The systems and methods of the present invention are adapted such that, when the objects and/or persons are in motion, the system may more frequently monitor the objects and/or persons. The systems and methods of the present invention are adapted such that, when the objects and/or persons are not in motion, the system may monitor the objects and/or persons less frequently thereby resulting in battery and system conservation. The systems and methods of the present invention allow for the use of a single receiver to monitor the location of a single or multiple transmitters.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 9 is a flow chart illustrating the method for tracking the location of an object in accordance with one embodiment of the present invention.

Figure 1:
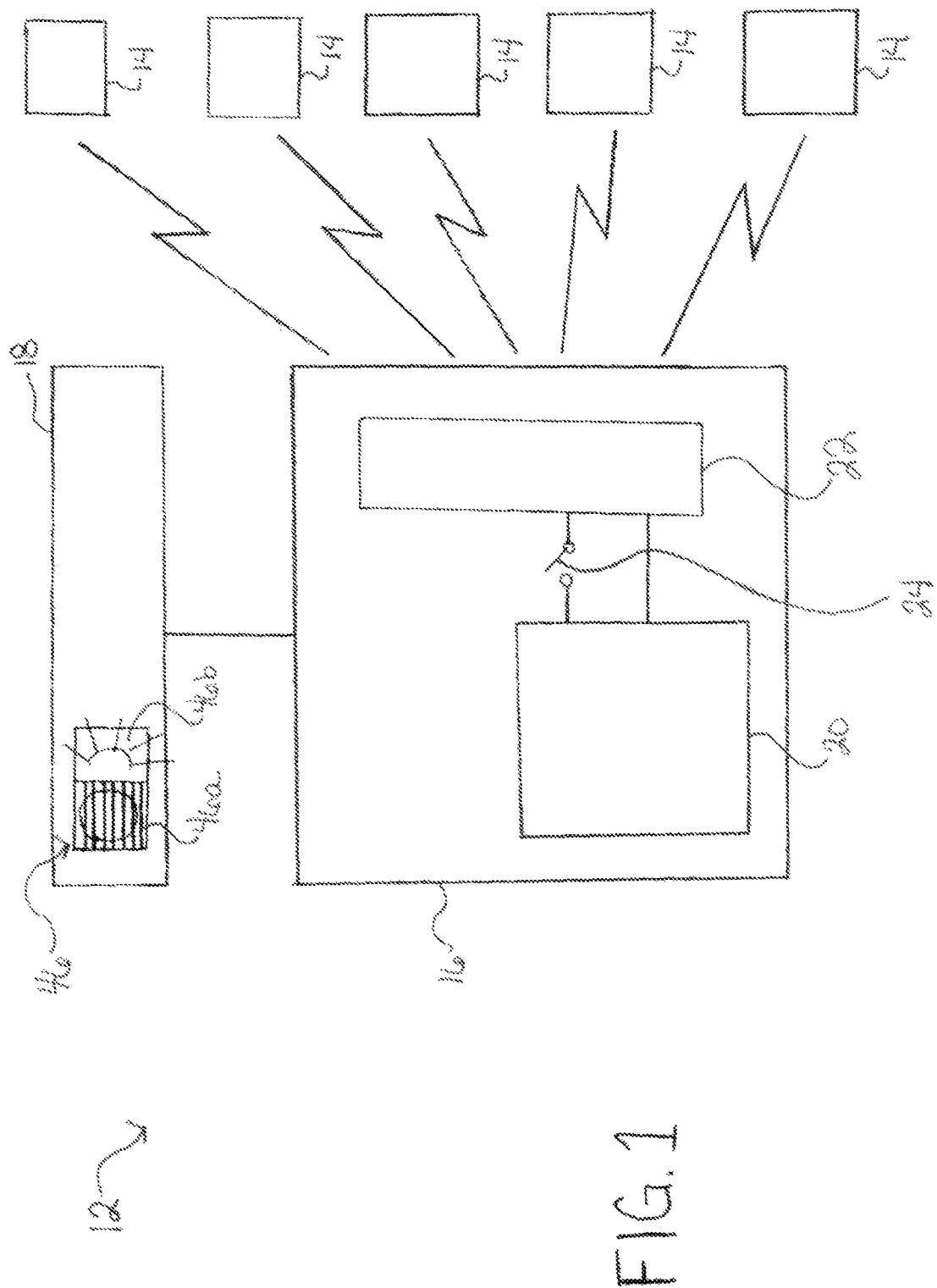
FIG. 1 is a diagram of a security system in accordance with one embodiment of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Referring to FIG. 1, a security system 12 in accordance with one embodiment of the present invention is illustrated. Security system 12 generally includes a plurality of first radio frequency devices or transmitter assemblies 14, second radio frequency device or receiver assembly 16 and security monitoring station 18. Receiver assembly 16 includes receiver 22, which is configured to receive radio frequency communications, and processor 20, which is communicatively coupled to receiver 22 and is adapted to process the radio frequency communications. Receiver assembly 16 also includes a wake-up switch 24 communicatively coupled to both receiver 22 and processor 20.

Figure 2:
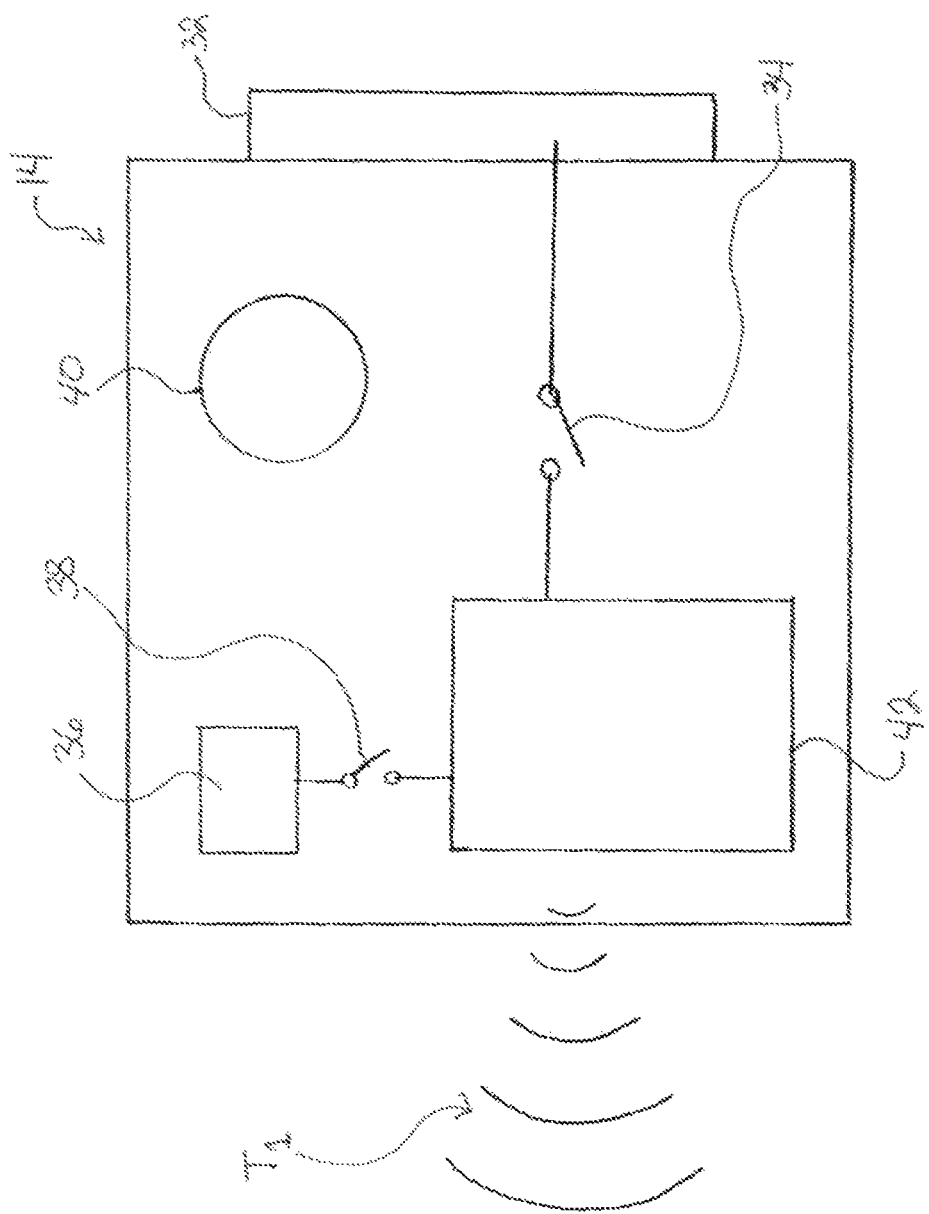
FIG. 2 is a diagram of a radio frequency transmitter for use in a security system in accordance with an embodiment of the present invention.

Turning to FIG. 2, each transmitter assembly 14 includes transmitter 42, which is adapted to transmit radio frequency communications. Transmitter assembly 14 also includes initialization button 36, which is communicatively coupled to transmitter 42 by initialization switch 38. Transmitter assembly 14 is powered by battery 40, which may be any battery capable of powering transmitter assembly 14 including, for example, a disposable battery or rechargeable battery. A motion detector 32 is communicatively coupled to transmitter assembly 14. Motion detector 32 may be removably coupled to transmitter assembly 14 and powered by its own battery or power source. Alternatively, motion detector 32 may be electrically linked to and powered by battery 40 of transmitter assembly 14. Motion detector 32 may also be included as an integral, non-removable component of transmitter assembly 14. Motion detector 32 is communicatively coupled to transmitter 42 by motion detection switch 34.

Referring back to FIG. 1, security monitoring station 18 is communicatively coupled to receiver assembly 16 and includes an alarm unit 46. Alarm unit 46 is adapted to provide a user with an alert, such as a visual and/or audible alert. Accordingly, alarm unit 46 may include speaker 46a capable of broadcasting an audible alert, and/or light 46b capable of producing an alert in the form of a visible illumination. Security monitoring station 18 may be communicatively coupled to receiver assembly 16 by an means including, for example, a hard wire connection or a wireless connection such as Bluetooth, WiFi, infrared, or other wireless means. It should be understood that, although monitoring station 18 is depicted as a component that is discrete form receiver assembly 16, monitoring station 18 may be integrated with receiver assembly 16 to form a single unit. In addition, it should also be understood that the system of the present invention may be configured such that processor 20 is alternatively located in monitoring station 18.

Figure 3:
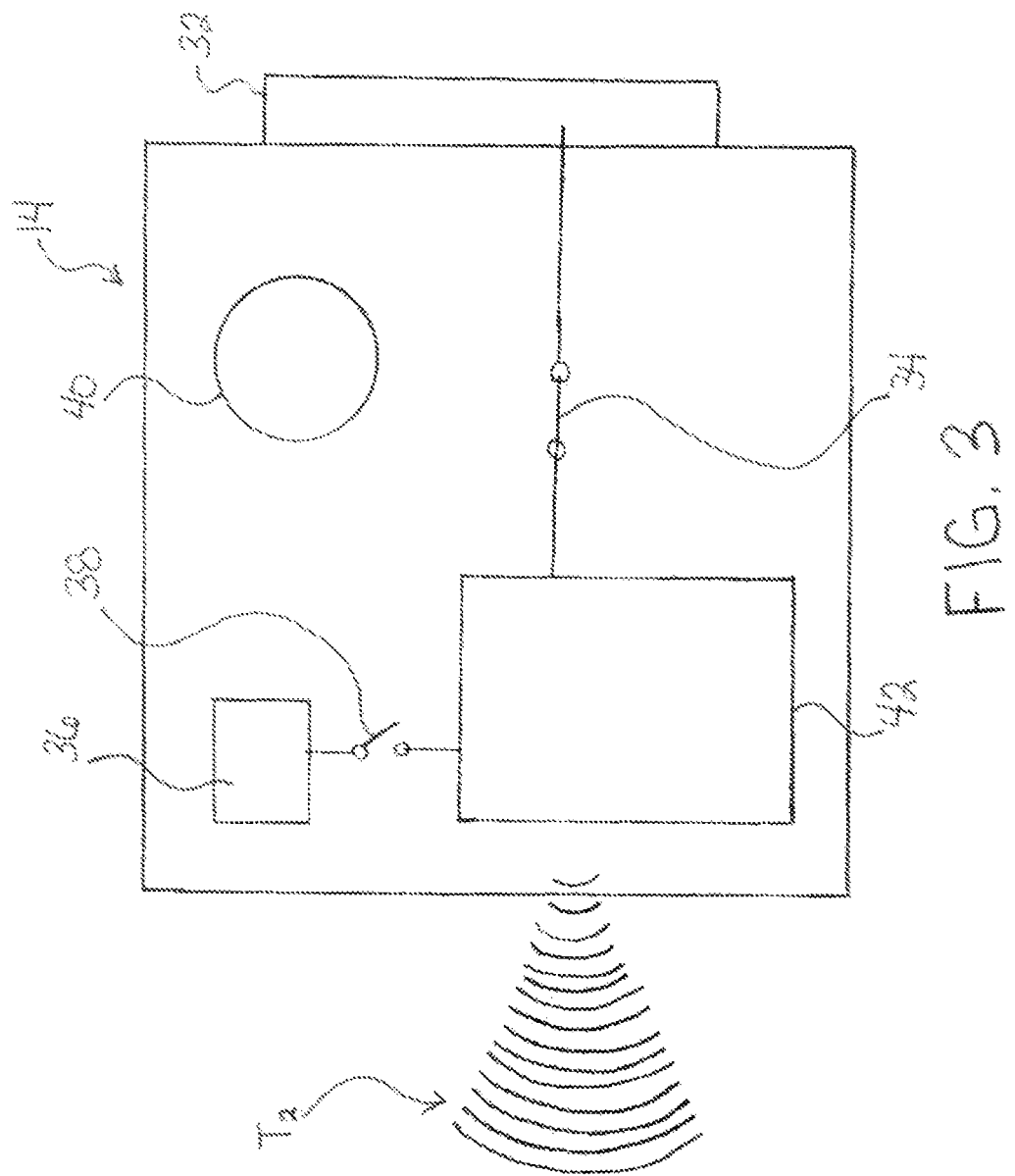
FIG. 3 is a diagram of the radio frequency transmitter of FIG. 2 wherein the motion switch has been triggered.
Figure 4:
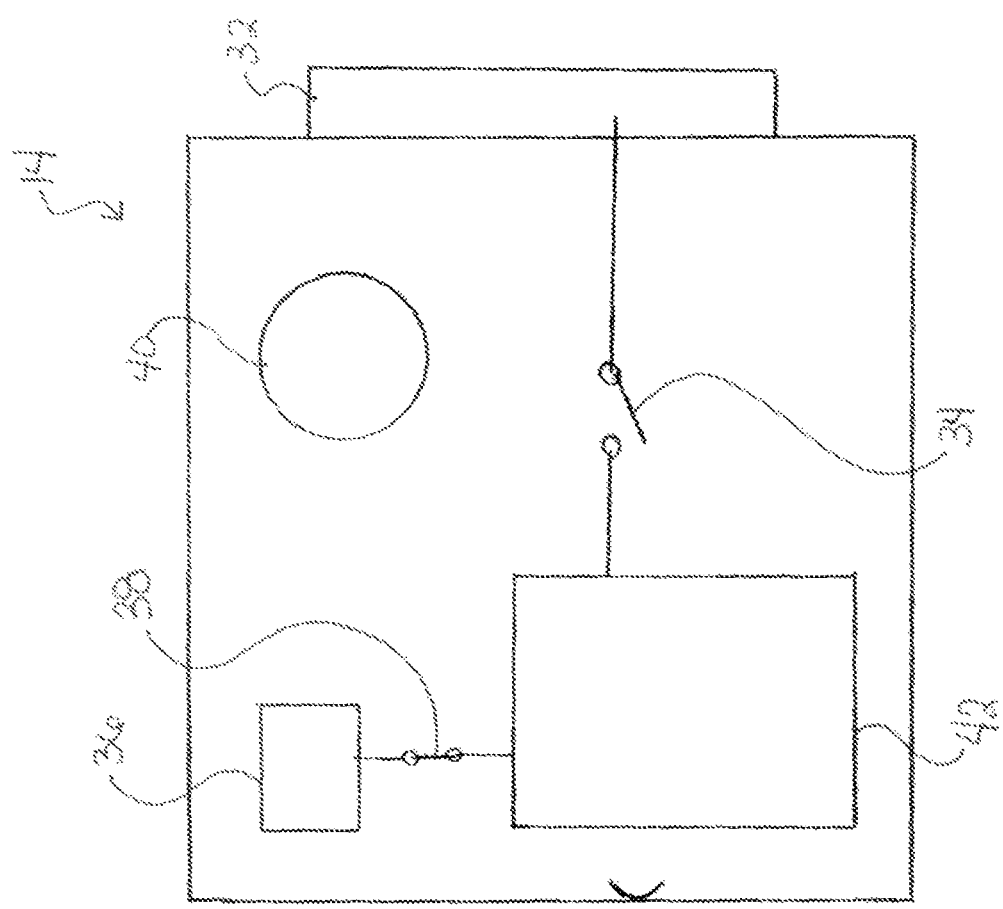
FIG. 4 is a diagram of the radio frequency transmitter of FIG. 2 wherein the initiation switch has been triggered.
Figure 5:
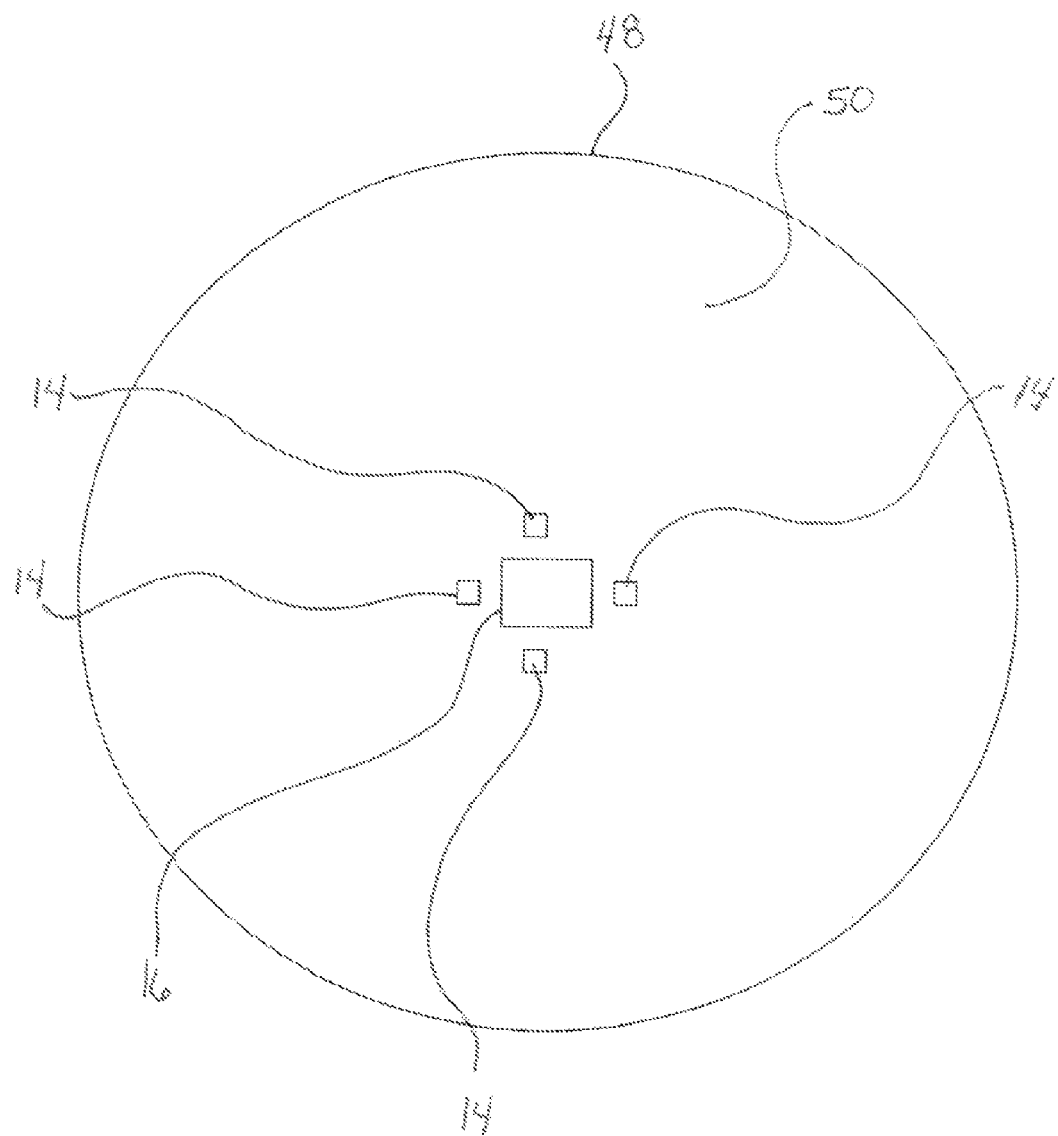
FIG. 5 is diagram of the security system in accordance with an embodiment of the invention and in the first phase of the calibration mode.

Turning to FIGS. 1 through 9, the operation of security system 12 will now be described. Security system 12 may be used to monitor the location and movement of an object or person within a given area. To that end, as illustrated in FIGS. 5 and 9, the first step 52 in using security system 12 (FIG. 1) is to define boundary 48 of area 50 in which the object or person is to be confined. Once area 50 is defined, receiver assembly 16 is placed centrally within area 50. In the next step 54, security system 12 (FIG. 1) is calibrated by establishing calibration baseline signals relating to boundary 48 and area 50. More particularly, as illustrated in FIGS. 4, 5 and 9, each of transmitter assemblies 14 is positioned at a location proximal receiver assembly 16 and the transmission of a first calibration signal is initiated, as set forth in step 54a. The transmission of the first calibration signal may be initiated by engaging initialization button 36 on transmitter assembly 14. Engaging initialization button 36 closes initialization switch 38, which triggers transmitter 42 to generate and transmit first calibration signal transmission $T_3$. First calibration signal transmission $T_3$ is received by receiver 22 of receiver assembly 16 and processor 20 records the strength of first calibration signal transmission $T_3$, as noted in step 54b. First calibration signal transmission $T_3$ may be embedded with identification information which identifies the particular transmitter assembly 14 from which signal transmission $T_3$ originates, and which enables signal transmission $T_3$ to be recognizable by processor 20 as a calibration signal. Such identification information may be included in first calibration signal transmission $T_3$ by transmitter 42 as a result of the engagement of initialization switch 38.

Transmitter assemblies 14 may transmit their signal transmissions $T_3$ in sequence such that there is no overlap of signal transmissions $T_3$ in time. Thus, receiver 22 may differentiate between, and record, the signal strengths of the various transmitter assemblies 14 individually.

Figure 6:
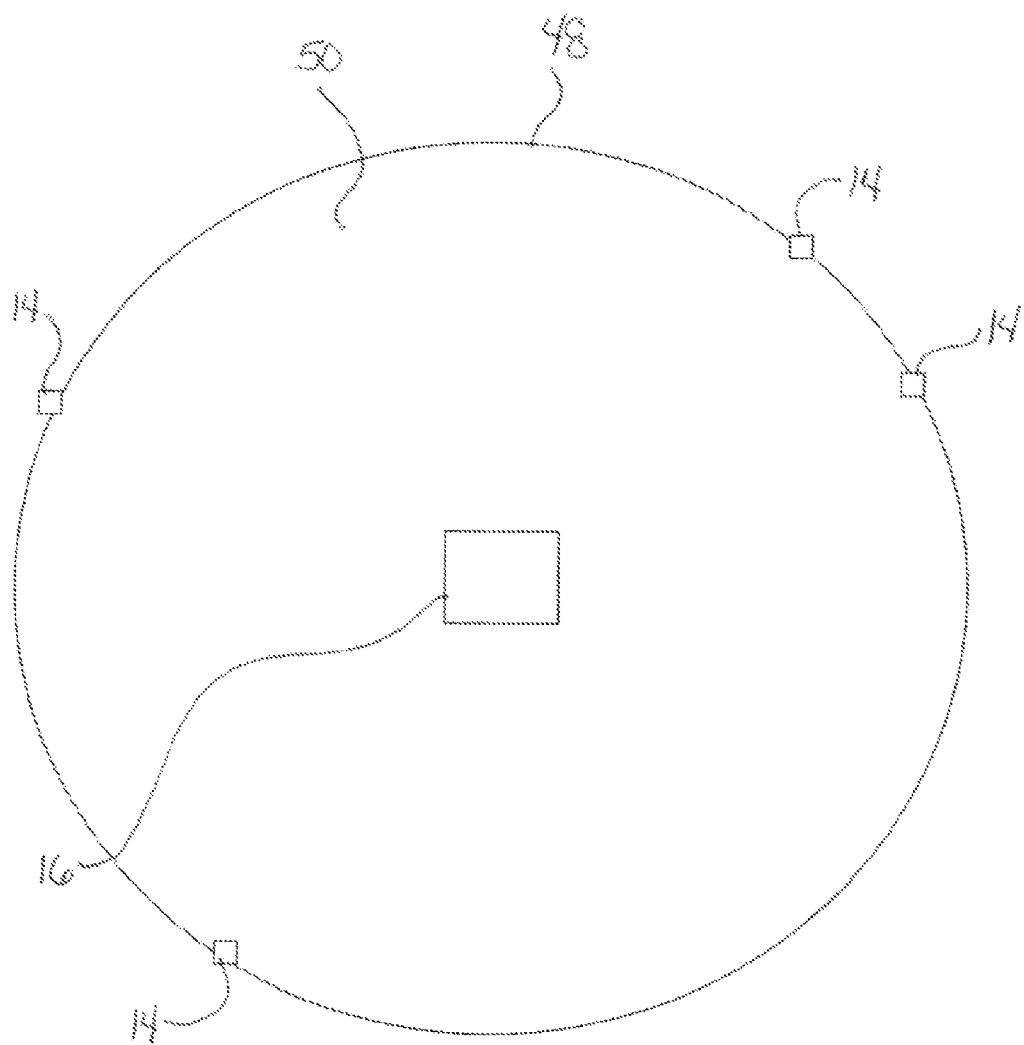
FIG. 6 is diagram of the security system of FIG. 5 in the second phase of the calibration mode.

Turning to FIGS. 4, 6 and 9, in the next step 54c, each of transmitter assemblies 14 is positioned at a location on boundary 48 and the transmission of a second calibration signal is initiated. The transmission of the second calibration signal may be initiated by engaging initialization button 36 on transmitter assembly 14 a second time. Engaging initialization button 36 closes initialization switch 38 a second time, which triggers transmitter 42 to generate and transmit second calibration signal transmission, which may also be represented as $T_3$ in FIG. 3. Second calibration signal transmission $T_3$ is received by receiver 22 of receiver assembly 16 and processor 20 (FIG. 1) records the strength of second calibration signal transmission $T_3$, as noted in step 54d. Second calibration signal transmission $T_3$ may be embedded with identification information which identifies the particular transmitter assembly 14 from which signal transmission $T_3$ originates, and which enables signal transmission $T_3$ to be recognizable by processor 20 as a calibration signal. Such identification information may be included in second calibration signal transmission $T_3$ by transmitter 42 as a result of the engagement of initialization switch 38. If desired, processor 20 (FIG. 1) may be configured to calculate and compare the strengths of first and second calibration signal transmissions to determine a relative distance from receiver assembly 16. In other words, the difference between the strengths of first and second calibration signal transmissions correlates with, and is indicative of, the distance between the receiver assembly 16 and boundary 48.

Again, transmitter assemblies 14 may transmit their signal transmissions $T_3$ in sequence such that there is no overlap of signal transmissions $T_3$ in time. Thus, receiver 22 may differentiate between, and record, the signal strengths of the various transmitter assemblies 14 individually.

Figure 7:
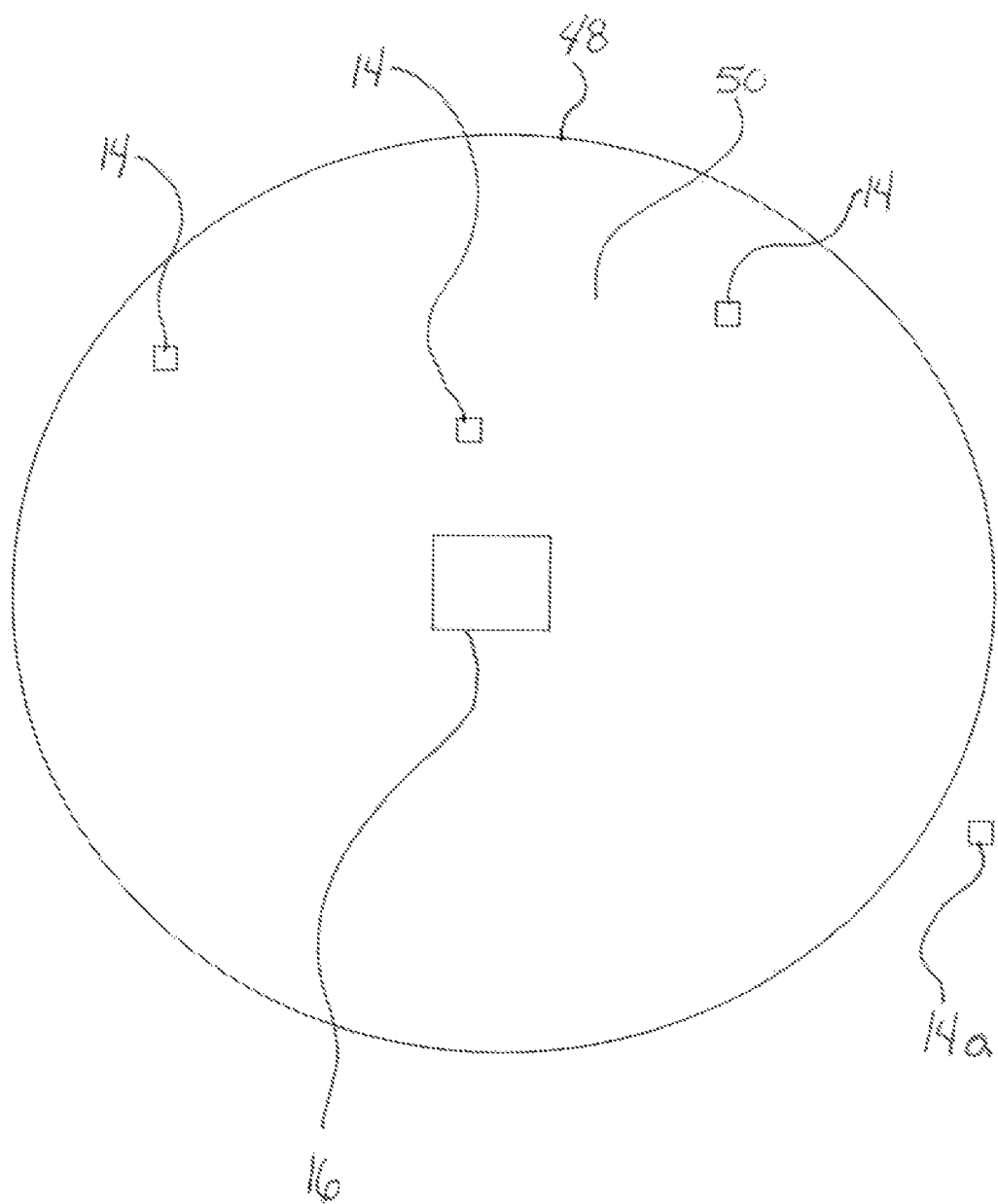
FIG. 7 is a diagram of the security system of FIG. 5 in use in the boundary area.
Figure 8:
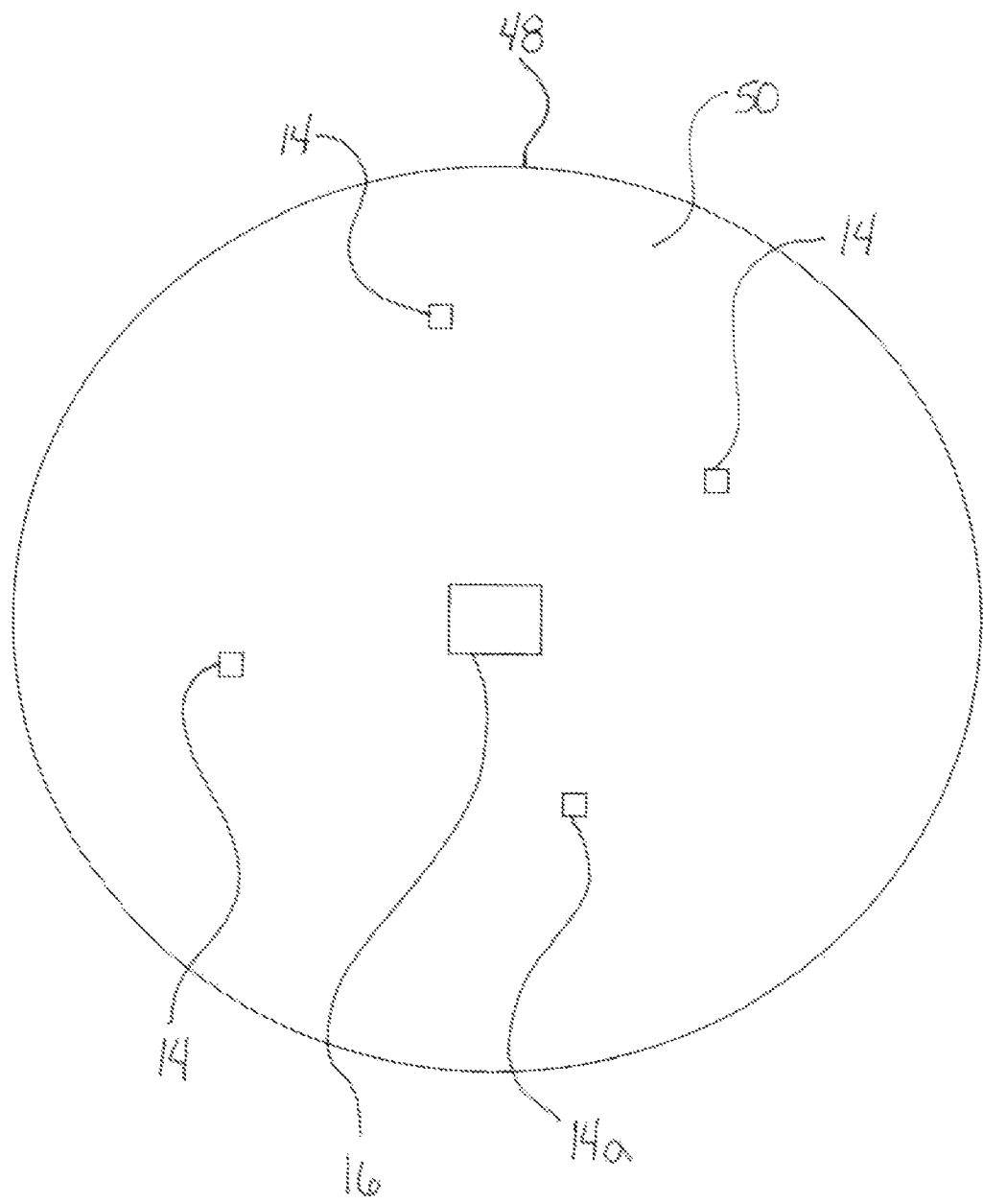
FIG. 8 is another diagram of the security system of FIG. 5 in use in the boundary area.

Referring to FIGS. 2, 7, 8 and 9, now that security system 12 (FIG. 1) is calibrated, each of transmitter assemblies 14 is coupled with motion detector 32 and then is coupled to the object or person to be monitored, as described in step 56. The object or person is then placed within area 50. As noted in step 58, motion detector 32 monitors transmitter assembly 14 for movement and, therefore, detects any movement of the object or person to which transmitter assembly 14 is coupled. As indicated in step 60, if no motion is detected, transmitter assembly 14 periodically transmits location signals $T_1$ (FIG. 2) at a first periodic rate, which are received by receiver assembly 16. Turning to step 62, processor 20 (FIG. 1) of receiver assembly 16 periodically processes location signals $T_1$ and compares the strength of the second calibration signal to determine whether transmitter assembly 14 is within boundary 48. This periodic comparison is performed at a first frequency rate. Turning to steps 62 and 68 of FIG. 9, if the strengths of location signals $T_1$ are less than the strength of the second calibration signal, then processor 20 (FIG. 1) assumes that the transmitting transmitter assembly 14 is outside of boundary 48, as illustrated by transmitter assembly 14a in FIG. 7, and processor 20 (FIG. 1) initiates alarm 46 (FIG. 1) at monitoring station 18 (FIG. 1). If the strength of location signals $T_1$ is not less than the strength of second calibration signal (i.e., if the strength of location signals $T_1$ is greater than the strength of second calibration signal), then processor 20 (FIG. 1) assumes that transmitter assembly 14 is within boundary 48, as shown in FIG. 8. Accordingly, processor 20 does not initiate alarm 46 (FIG. 1) and the process continues at step 58 in FIG. 9.

The transmissions of the location signals may be staggered in time such that there is no overlap in time of the transmissions. Alternatively, each of transmitter assemblies 14 may transmit at a different frequency (e.g., each on the order of 1 MHz) such that receiver assembly 16 may differentiate between the signal strengths of the various transmitter assemblies 14.

Referring now to FIGS. 3, 7, 8 and 9, if motion detector 32 detects motion, motion detector switch 34 is triggered, as illustrated in FIG. 3. As indicated in step 64 in FIG. 9, the triggering of motion detector switch 34 causes transmitter 42 to transmit location signals $T_2$ at a second periodic rate. This second periodic rate may be greater than the first periodic rate at which location signals $T_1$ (FIG. 2) are transmitted. In other words, when motion is detected by motion detector 32, motion detector switch 34 is triggered to cause transmitter 42 to more frequently transmit location signals. Accordingly, when the object or person to which transmitter assembly 14 is attached is in motion, motion detector 32, motion detector switch 34 and transmitter 42 cooperate to cause transmitter assembly 14 to send location signals more frequently.

When motion detector switch 34 is triggered, a wake-up signal is supplied to receiver assembly 16, which triggers wake-up switch 24 (FIG. 1). The wake-up signal may be embedded in, and/or transmitted simultaneously with, location signals $T_2$. Alternatively, the wake-up signal may be transmitted at a different time than location signals $T_2$. For example, the wake-up signal may be transmitted immediately before or after the location signals $T_2$. Receiver assembly 16 may look for the wake-up signal at such designated periodic points in time. The triggering of wake-up switch 24 (FIG. 1) signals processor 20 (FIG. 1) to process and compare the strengths of locations signals $T_2$ with the strength of the second calibration signal at a second frequency rate. The second frequency rate is greater than the first frequency rate, such that when wake-up switch 24 is triggered, processor 20 processes and compares location signals $T_2$ with the second calibration signal more frequently than when wake-up switch 24 is not triggered. That is, in response to motion detector 32 detecting motion, the time intervals between the transmissions from transmitter assembly 14 to receiver assembly 16 may be decreased from the lengths of the time intervals before motion detector 32 detected motion.

Turning to steps 66 and 68 of FIG. 9, if the strength of location signals $T_2$ is less than the strength of the second calibration signal, then processor 20 (FIG. 1) assumes that transmitter assembly 14 (see 14a in FIG. 7) is outside of boundary 48, and processor 20 (FIG. 1) initiates alarm 46 (FIG. 1) at monitoring station 18 (FIG. 1). If the strength of location signals $T_2$ is not less than the strength of the second calibration signal (e.g., if the strength of location signals $T_2$ is greater than the strength of second calibration signal), then processor 20 (FIG. 1) assumes that transmitter assembly 14 is within boundary 48, as shown in FIG. 8. Accordingly, processor 20 does not initiate alarm 46 (FIG. 1).

Processor 20 may continue to process and compare location signals $T_2$ with the second calibration signal at the second, higher frequency rate for a configurable period of time after motion was last detected. In one embodiment, the configurable period of time is a predetermined period of time. The motion detector may continue to monitor for movement during the configurable period of time. If the motion detector detects motion before the expiration of the configurable period of time, then the configurable period of time may be reset. After expiration of the configurable period of time, the process continues at step 58 in FIG. 9.

Security system 12 may also be configured such that processor 20 calculates the distance or position of transmitter assembly 14 relative to receiver assembly 16 and boundary 48 by comparing the strength of the location signals to both first and second calibration signals. That is, processor 20 may determine the distance between transmitter assembly 14 and receiver assembly 16 as well as the distance between transmitter assembly 14 and boundary 48. In so doing, processor 20 may be adapted to determine whether transmitter assembly 14 is moving toward or away from boundary 48. Processor 20 may also be adapted to detect how quickly transmitter assembly 14 is moving in the determined direction by ascertaining a rate of change in the incoming location signals.

Turning to FIGS. 1, 7 and 8, security system 12 is adapted to monitor multiple objects and/or people. Receiver assembly 16 is adapted to receive and process signals from numerous transmitter assemblies. As illustrated in FIG. 8, all transmitter assemblies 14, 14a are within boundary 48 and are transmitting location signals to receiver assembly as described above. Because all transmitter assemblies 14, 14a are within boundary 48, the location signal from each is expected to be greater in strength than the second calibration signal representing the boundary 48. Turning to FIG. 7, transmitter assemblies 14 are within boundary 48, but transmitter assembly 14a has moved outside of boundary 48. Accordingly, the location signal transmitted by transmitter assembly 14a is expected to be weaker than the second calibration signal, thereby causing receiver assembly 16 to trigger alarm 46 (FIG. 1) on monitoring station 18 (FIG. 1).

It should be understood that processor need not be limited to initiating alarm 46 only when a transmitter assembly 14 moves outside of boundary 48. Rather, security system 12 may be adapted such that processor 20 initiates alarm 46 when certain thresholds are met. For instance, processor 20 could be configured to initiate alarm 46 when transmitter assembly 14 transmits a location signal that has a strength that is less than a predetermined value that is based on the second calibration signal. For example, it may be desirable to raise the alarm when transmitter assembly 14 comes within five feet of boundary 48. For exemplary purposes, we assume that this distance of five feet within boundary 48 results in a location signal that is 10% stronger than the second calibration signal. Accordingly, processor 20 can be adapted to initiate alarm 46 when the strength of the location signal of transmitter assembly 14 is equal to or less that the value of the strength of the second calibration signal plus 10%.

Referring back to FIGS. 1 and 2, by operation as described above, security system 12 can monitor objects and/or people within a desired area and can provide alerts when objects are removed from, or people leave, the area. When the object or person is in motion, there is a greater need for monitoring the location of the transmitter assembly. Because the rate at which transmitter assembly 14 transmits location signals to receiver assembly 16 increases when motion detector 32 detects motion, security system 12 is adapted to more closely monitor the objects and/or persons when they are in motion. On the other hand, transmitter assembly 14 is adapted to transmit location signals at a low periodic rate when the object and/or person is stationary and the motion detector is not detecting motion. When the object and/or person to be monitored is stationary, there is less risk that the object or person is moving from the bounded area 50. Accordingly, when the object is not in motion, battery power is preserved because transmission of location signals is less frequent. In addition, when motion is detected, security system 12 is adapted to trigger processor 20 to process and/or monitor the location signals more frequently by triggering wake-up switch 24.

As described above, a separation distance may be periodically determined between a first radio frequency device and a second radio frequency device based on strengths of radio frequency location signals transmitted from the first radio frequency device to the second radio frequency device. However, it is to be understood that separation distance may be determined based upon some signal quality other than strength. Moreover, the present invention is applicable to, and encompasses, embodiments in which the transmitted signals are not radio frequency signals. For example, the signals may be infrared, optical, microwave, or sound signals, among other possibilities.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A security system for tracking a location of at least one object within an area defined by a boundary, the security system comprising:
at least one first radio frequency device, each said first radio frequency device being coupled to a corresponding one said object, said at least one first radio frequency device adapted to periodically transmit radio frequency location signals, said at least one first radio frequency device including a boundary calibration switch, said boundary calibration switch being configured to initiate transmission of at least one boundary calibration signal from said at least one first radio frequency device;
a second radio frequency device discrete from said first radio frequency device and configured to receive said radio frequency location signals;
at least one motion detector coupled with said at least one first radio frequency device, said at least one motion detector configured to detect when the at least one first radio frequency device is in motion, wherein said at least one first radio frequency device is configured to periodically transmit said radio frequency location signals at a first rate while said at least one first radio frequency device is not in motion, and wherein said at least one first radio frequency device is configured to periodically transmit said radio frequency location signals at a second rate in response to said motion detector detecting movement of said at least one first radio frequency device, said second rate being greater than said first rate; and
a processor communicatively coupled with said second radio frequency device, said processor being adapted to process said at least one boundary calibration signal and store data relating to said at least one boundary calibration signal, said processor being adapted to compare the data relating to said at least one boundary calibration signal to separation distance data related to said radio frequency location signals.

2. The security system of claim 1 wherein said second radio frequency device includes a processor, said processor being adapted to periodically calculate a separation distance between the first radio frequency device and the second radio frequency device based on the strengths of the radio frequency location signals.

3. The security system of claim 2 further including an alarm communicatively coupled with said processor, said alarm adapted to provide an alarm signal in response to said separation distance being greater than a boundary distance, said boundary distance being a distance between said second radio frequency device and a point on the boundary.

4. The security system of claim 2 wherein said motion detector initiates transmission of a wake up signal in response to said motion detector detecting motion of said at least one first radio frequency device, wherein said second radio frequency device includes a wake up switch, said wake up switch being triggered in response to said wake up signal being received, and wherein, in response to said wake up switch being triggered, said processor is configured to periodically calculate said separation distance at a greater periodic rate relative to when said wake up switch is not triggered.

5. The security system of claim 1 wherein said at least one first radio frequency device includes a plurality of first radio frequency devices.

6. A security system for tracking a location of an object within an area defined by a boundary, the security system comprising:
- a first radio frequency device adapted to be coupled to the object and to periodically transmit radio frequency location signals, said at least one first radio frequency device including a manually actuatable boundary calibration switch, said boundary calibration switch being configured to initiate transmission of at least one boundary calibration signal from said at least one first radio frequency device in response to being manually actuated;
- a second radio frequency device discrete from said first radio frequency device and configured to receive said radio frequency location signals, said second radio frequency device being adapted to periodically calculate a separation distance between the first radio frequency device and the second radio device based on strengths of the radio frequency location signals; and
- a motion detector coupled with said first radio frequency device, said motion detector configured to detect when said first radio frequency device is in motion, said motion detector configured to initiate a wake up signal in response to said motion detector detecting motion of said first radio frequency device, wherein said second radio frequency device is configured to receive said wake up signal and wherein, in response to said second radio frequency device receiving said wake up signal, said second radio frequency device is configured to periodically calculate said separation distance at a greater periodic rate relative to a time before said second radio frequency device receives said wake up signal; and
- a processor communicatively coupled to said second radio frequency device, said processor being adapted to process said at least one boundary calibration signal and store data relating to said at least one boundary calibration signal, said processor being adapted to compare the data relating to said at least one boundary calibration signal to location data relating to said radio frequency location signals.

7. The security system of claim 6 wherein the first radio frequency device periodically transmits said radio frequency location signals at a first rate when said first radio frequency device is not in motion, and wherein the first radio frequency device periodically transmits said radio frequency location signals at a second rate in response to said motion detector detecting movement of said first radio frequency, said second rate being greater than said first rate.

8. The security system of claim 6 further including an alarm adapted to provide an alarm signal when said separation distance is greater than a preset value.

9. The security system of claim 6 wherein said at least one first radio frequency device includes a plurality of first radio frequency devices, the first radio frequency devices being adapted to transmit the radio frequency location signals in sequence such that the radio frequency location signals from the first radio frequency devices are staggered in time relative to each other and such that none of the radio frequency location signals overlap each other in time.

* * * * *